United States Patent
Hoshino et al.

(10) Patent No.: US 8,168,080 B2
(45) Date of Patent: May 1, 2012

(54) IDENTIFYING MEDIUM, IDENTIFYING MEDIUM MANUFACTURING METHOD, ARTICLE, AND IDENTIFYING MEDIUM IDENTIFYING METHOD

(75) Inventors: Hidekazu Hoshino, Yokohama (JP); Itsuo Takeuchi, Yokohama (JP); Shinya Nasubida, Yokohama (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 171 days.

(21) Appl. No.: 12/309,953

(22) PCT Filed: Aug. 9, 2007

(86) PCT No.: PCT/JP2007/065653
§ 371 (c)(1),
(2), (4) Date: Feb. 4, 2009

(87) PCT Pub. No.: WO2008/018560
PCT Pub. Date: Feb. 14, 2008

(65) Prior Publication Data
US 2009/0242834 A1    Oct. 1, 2009

(30) Foreign Application Priority Data

Aug. 9, 2006  (JP) .................................. 2006-216473

(51) Int. Cl.
*C09K 19/00* (2006.01)
*C09K 19/06* (2006.01)
*C09K 19/32* (2006.01)
*C09K 19/52* (2006.01)

(52) U.S. Cl. ........ 252/299.01; 430/20; 428/1.1; 345/87; 349/1; 349/56; 349/118

(58) Field of Classification Search ............. 252/299.01; 430/20; 428/1.1; 345/87; 349/1, 56, 118
See application file for complete search history.

(56) References Cited

U.S. PATENT DOCUMENTS
2006/0251863 A1   11/2006   Katschorek et al.

FOREIGN PATENT DOCUMENTS

| | | |
|---|---|---|
| JP | A 2000-066136 | 3/2000 |
| JP | A 2002-90533 | 3/2002 |
| JP | A 2006-133385 | 5/2006 |
| JP | A 2006-139178 | 6/2006 |
| JP | A 2006-171259 | 6/2006 |
| JP | A 2006-525139 | 11/2006 |
| WO | WO 2004/095090 A1 | 11/2004 |

*Primary Examiner* — Geraldina Visconti
(74) *Attorney, Agent, or Firm* — Oliff & Berridge PLC

(57) ABSTRACT

An identifying medium comprises a nematic liquid crystal layer for forming a latent image with gradation, and the nematic liquid crystal layer has a thickness distribution corresponding to the gradation.

18 Claims, 5 Drawing Sheets

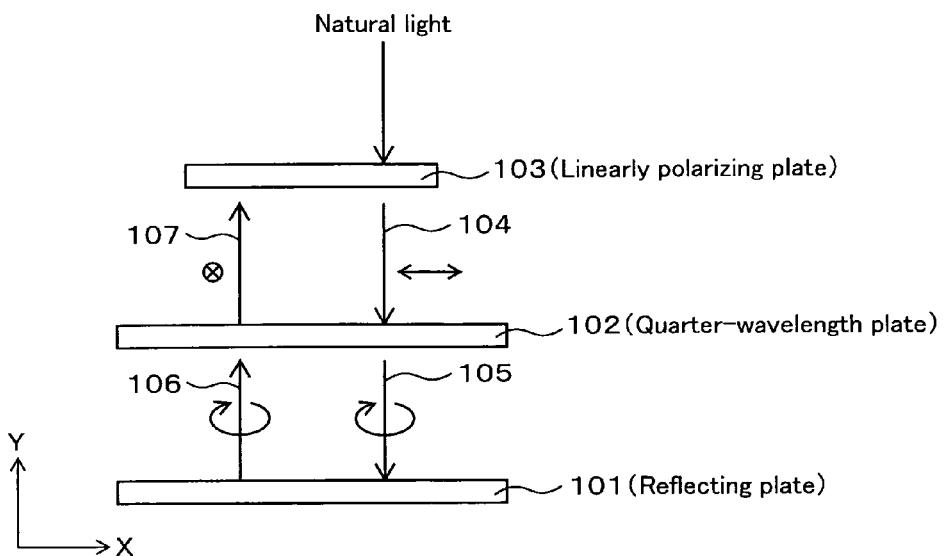
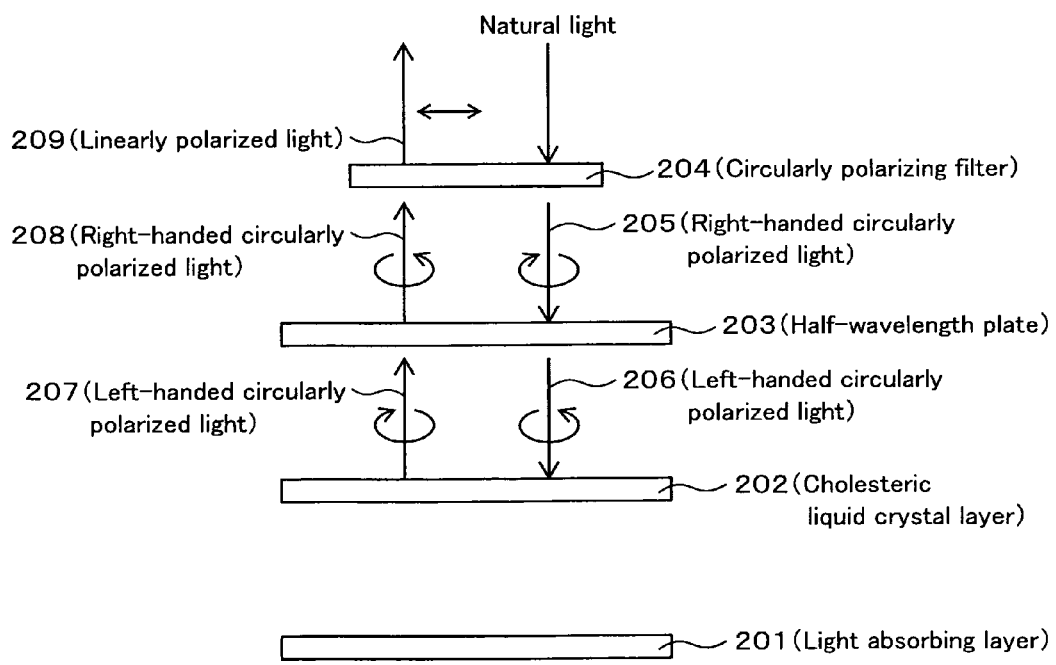

IDENTIFYING MEDIUM, IDENTIFYING MEDIUM MANUFACTURING METHOD, ARTICLE, AND IDENTIFYING MEDIUM IDENTIFYING METHOD

TECHNICAL FIELD

The present invention relates to an identifying medium that allows determination of whether or not articles are authentic by use of visual effects.

BACKGROUND ART

A technique for identification is disclosed in Japanese Patent Application Laid-Open No. 2006-139178, for example. In this technique, an image (latent image), which cannot be visually perceived by eye, is formed on an article, and identification of the article is performed by observing the article using a polarizing plate and recognizing a latent image. This technique utilizes a phenomenon in which optical characteristics differ according to orientation conditions of a liquid crystal.

DISCLOSURE OF THE INVENTION

In an identifying medium using the above-described latent image, since the latent image is formed by utilizing the difference in the orientation condition of the liquid crystal, in order to exhibit fine tones, the orientation condition must be set in accordance with the fine tones. This technique is difficult, and the production cost may be high if this technique is put into practice, whereby this technique is not practical. An object of the present invention is to provide an identifying medium in which a multiple-tone latent image is formed at low cost.

The present invention provides an identifying medium including a nematic liquid crystal layer for forming a latent image having contrasting densities, and the nematic liquid crystal layer has a thickness distribution corresponding to the contrasting densities. The present invention uses a birefringence characteristic of the nematic liquid crystal layer, in which a polarized wave component of light that transmits the nematic liquid crystal layer is changed according to the thickness of the nematic liquid crystal layer. According to the present invention, a latent image that cannot be (or is not easily) directly observed by eye, is visually perceived by observing through a linearly polarizing plate or a circularly polarizing plate, whereby identification is performed. The intensity of light, which will be visually perceived, can be freely selected by adjusting the thickness of the nematic liquid crystal layer, and therefore, the above latent image is formed to be a continuous-tone image (an image having contrasting densities) by making the nematic liquid crystal layer have a thickness distribution.

The present invention also provides an identifying medium including a nematic liquid crystal layer for forming a latent image, and the nematic liquid crystal layer generates a distribution of phase difference within a range in which a phase is shifted from (n/2) wavelength (n is a natural number including 0) by ±(¼) wavelength with respect to a wavelength used in identification. The latent image has tones due to the distribution of the phase difference. That is, the nematic liquid crystal layer is formed to generate a distribution of phase difference within a range in which a phase is shifted from (n/2) wavelength by ±(¼) wavelength with respect to a wavelength used in identification, thereby forming a latent image exhibiting tones due to the distribution of phase difference. In this condition, when n=0, the distribution of phase difference is set within a range of 0 to (¼) wavelength.

The function of the present invention is described hereinafter. First, a basic function is described. By setting a value of (Δnd) (called "retardation") obtained by multiplying a difference (Δn) in refractive indexes between a long axis direction and a short axis direction of liquid crystal molecules and a thickness d of a liquid crystal layer, the nematic liquid crystal layer functions as a quarter-wavelength plate. The quarter-wavelength plate is a wavelength plate that generates a phase difference of π/2 (90°) between mutually perpendicular polarized components. By using the quarter-wavelength plate, linearly polarized light is converted into circularly polarized light, or circularly polarized light is converted into linearly polarized light.

FIG. 1 is a schematic drawing describing a function of the present invention. FIG. 1 shows a structure formed by laminating a nematic liquid crystal layer 102 that functions as a quarter-wavelength plate on a reflecting plate 101 that reflects light, and FIG. 1 schematically shows a condition of observing the structure through a linearly polarizing plate 103. In this case, by rotating the linearly polarizing plate 103, when a transmission axis thereof (polarized direction of linearly polarized light to be transmitted therethrough) forms an angle of 45° with respect to long axes or short axes of liquid crystal molecules of the nematic liquid crystal layer 102, reflected light is barely observed (the structure appears to be dark).

This condition occurs due to the following function. In the example in FIG. 1, linearly polarized light 104 (polarized in the X direction) transmitted through the linearly polarizing plate 103 is transmitted through the nematic liquid crystal layer 102 and is thereby converted to right-handed circularly polarized light 105. The right-handed circularly polarized light 105 is reflected at the reflecting plate 101, whereby a circling direction thereof is reversed, and the right-handed circularly polarized light 105 is converted to left-handed circularly polarized light 106. The left-handed circularly polarized light 106 is transmitted through the nematic liquid crystal layer 102 from a direction opposite to the previous direction. As a result, the left-handed circularly polarized light 106 is converted to linearly polarized light in which the polarized direction is shifted by 90° with respect to the linearly polarized light 104, that is, linearly polarized light 107 polarized in a direction perpendicular to a XY plane in FIG. 1. Since the linearly polarized light 107 cannot pass through the linearly polarizing plate 103, the linearly polarized light 107 is blocked and cannot be observed. Thus, the structure appears to be dark.

In this case, if the thickness of the nematic liquid crystal layer 102 is 0, the function of the nematic liquid crystal layer 102 of converting linearly polarized light to circularly polarized light is not obtained, and the linearly polarized light 104 is directly reflected at the reflecting plate 101. Therefore, in observing this structure under the same conditions as the above, the polarized direction of the reflected light from the reflecting plate 101 is the same as that of the linearly polarized light 104, whereby the reflected light is transmitted through the linearly polarizing plate 103 and is observed. That is, this structure appears to be bright. The structure also appears to be bright by forming the nematic liquid crystal layer 102 so as to function as a half-wavelength plate for generating a phase difference of π or a one-wavelength plate for generating a phase difference of 2π.

In the same observing condition, the thickness of the nematic liquid crystal layer 102 is adjusted so as to function as a wavelength plate for generating a phase difference of 0 to (¼)λ. In this case, the effect of the nematic liquid crystal layer 102 of converting linearly polarized light to circularly polarized light is changed to an effect of converting linearly polarized light to elliptically polarized light according to the phase difference. The aspect ratio (ratio of long axis and short axis) of the elliptically polarized light corresponds to the phase difference generated by the nematic liquid crystal layer 102. As a result, the aspect ratio of elliptically polarized light entering from the lower side into the linearly polarizing plate 103 depends on the thickness of the nematic liquid crystal layer 103. The intensity of light, which is transmitted thorough the linearly polarizing plate 103 and is observed, changes according to the aspect ratio of the elliptically polarized light that enters thereinto. Therefore, the intensity of the reflected light observed through the linearly polarizing plate 103 depends on the phase difference generated by the nematic liquid crystal layer 102, that is, the thickness (the value of $\Delta nd$) of the nematic liquid crystal layer 102. Accordingly, when the nematic liquid crystal layer 102 has a distribution of thickness that is varied with the portion thereof, in observation through the linearly polarizing plate 103, differences in contrasting density among the portions are observed.

The above description is a function of the present invention. That is, the thickness of the nematic liquid crystal layer provided on a light-reflecting surface varies with the portion thereof, for example, so that the nematic liquid crystal layer functions as from a 1-wavelength plate to a ¼-wavelength plate in accordance with contrasting densities of an image. As is clear from the above-described function, since the intensity of reflected light observed through the linearly polarizing plate varies according to the thickness of the nematic liquid crystal layer, the intensity of the reflected light observed through the linearly polarizing plate is changed by partially changing the thickness of the nematic liquid crystal layer. Thus, an image having contrasting densities is observed.

On the other hand, when the nematic liquid crystal layer is directly observed without using the linearly polarizing plate, the thickness distribution of the nematic liquid crystal layer is barely observed (or is not easily observed), whereby the image having contrasting densities, which can be observed by using the linearly polarizing plate as described above, is not observed (or is not easily observed). Thus, an image (latent image), which cannot be observed (or is not easily observed) in direct observation without using the linearly polarizing plate and which can be visually perceived in observation through the linearly polarizing plate, is obtained.

As is clear from the above-described function, the phase difference generated by the nematic liquid crystal layer is set by the thickness of the nematic liquid crystal layer. Therefore, by forming the thickness distribution of the nematic liquid crystal layer to correspond to the tones of a latent image, a latent image having contrasting densities is formed. When an identifying medium is affixed to a surface having a light-reflecting characteristic, a reflecting layer is not specifically required; however, the light-reflecting layer may be disposed under the nematic liquid crystal layer.

Forming a liquid crystal layer to have a thickness distribution can be performed at low cost by a printing method, and an identifying medium of the present invention is thereby produced at low cost. Since identification is performed by using an indication having multiple tones, superior identifying characteristics are obtained. Although the production is performed at low cost, setting of the thickness of a liquid crystal layer in order to exhibit tones requires technical know-how, and quantitative evaluation of the thickness distribution is not easily performed by reverse engineering, whereby superior anticounterfeiting effects are obtained.

Specifically, the nematic liquid crystal layer is desirably formed by ink jet printing using liquid crystal ink. In the ink jet printing, the thickness of the liquid crystal layer is precisely set by adjusting the volume of the liquid crystal ink to be jetted. Therefore, highly precise and fine tone images are easily produced, compared to the technique disclosed in Japanese Patent Application Laid-Open No. 2006-139178. An existing printing apparatus may be used, whereby the production cost is decreased and is low.

In the present invention, a layer having a diffraction grating structure may be arranged over or under the nematic liquid crystal layer. As a layer having a diffraction grating structure, a layer in which a transparent resin layer is embossed and is formed with a hologram may be mentioned. Alternatively, a light-reflecting layer may be arranged under the nematic liquid crystal layer, and a diffraction grating structure may be formed on the light-reflecting layer. According to these structures, an identifying effect, in which an image formed by the diffraction grating structure and a latent image are combined, is obtained. For example, in the latter case, when the nematic liquid crystal layer has a distribution of thickness required for functioning as from a 1-wavelength plate to a ¼-wavelength plate, only a design of the hologram is observed by direct viewing, and a latent image of a graded image with the hologram corresponding to the thickness distribution of the nematic liquid crystal layer emerges by observing through the linearly polarizing plate.

The present invention includes articles provided with an identifying medium having the above-described characteristics. As the article, passports, bonds, important documents, various types of cards (credit cards, identification cards, and the like), various types of certification, gift certificates, clothing items, commodities, storage media, electric appliances, machine components, electronic components, and other various products may be exemplified. In addition, packages and packing materials for articles may be exemplified as the articles. Moreover, tags and price tags of products using the identifying medium of the present invention may be exemplified as the article.

The present invention also includes a method for identifying an identifying medium having the above-described characteristics. That is, the present invention provides an identifying method for an identifying medium formed with a latent image, and the identifying method includes photographing an identifying medium having the above-described characteristics through a linearly polarizing plate, detecting the latent image, and identifying based on the latent image. The identification is performed by photographing the image by a camera so as to obtain an image data, and by comparing the image data with a standard image data.

The present invention also provides an identifying medium including a cholesteric liquid crystal layer and a nematic liquid crystal layer for forming a latent image, which is formed over the cholesteric liquid crystal layer. The nematic liquid crystal layer generates a distribution of phase difference within a range in which a phase is shifted from n+(½) wavelength (n is a natural number including 0) by ±(½) wavelength with respect to a wavelength used in identification, and the distribution of phase difference produces tones of the latent image.

In the present invention, when the identifying medium is observed through a circularly polarizing plate, the intensity of reflected light, which enters into the cholesteric liquid crystal layer and is reflected thereat, varies according to the distribution of phase difference of the nematic liquid crystal layer. Accordingly, an image (latent image) indicated by multiple tones is not observed (or is not easily observed) when the circularly polarizing plate is not used, whereas the image is perceived by observing through the circularly polarizing plate.

Hereinafter, a function of the present invention using the above-described cholesteric liquid crystal layer is described. FIG. 2 is a schematic drawing describing a function of the present invention. FIG. 2 shows an optical medium in which a light absorbing layer 201, a cholesteric liquid crystal layer 202, and a nematic liquid crystal layer 203 that functions as a half-wavelength plate are laminated, and FIG. 2 schematically shows a condition of observing the optical medium through a circularly polarizing filter 204. In this case, the circularly polarizing filter 204 is set to selectively transmit right-handed circularly polarized light, and the cholesteric liquid crystal layer 202 is set to selectively reflect left-handed circularly polarized light in gold.

Natural light entering into the circularly polarizing filter 204 is converted to right-handed circularly polarized light 205, and the right-handed circularly polarized light 205 is converted to left-handed circularly polarized light 206 by the nematic liquid crystal layer 203 functioning as a half-wavelength plate. Then, a gold wavelength component of the left-handed circularly polarized light 206 is selectively reflected at the cholesteric liquid crystal layer 202. The reflected light of the wavelength component is left-handed circularly polarized light 207. The left-handed circularly polarized light 207 is converted to right-handed circularly polarized light 208 by the nematic liquid crystal layer 203 and is transmitted through the circularly polarizing filter 204, and is thereby observed as linearly polarized light 209. That is, the optical medium appears to be bright. The linearly polarized light 209 is observed because the circularly polarizing filter 204 is formed by combining a linearly polarizing filter with a quarter-wavelength plate, in that order, from the observing side. In this case, when the right-handed circularly polarized light 208 enters into the circularly polarizing filter 204 from the lower side in the figure, the right-handed circularly polarized light 208 is converted to linearly polarized light by the quarter-wavelength plate. Then, the linearly polarized light is transmitted through the linearly polarizing plate and is converted to linearly polarized light 209.

If the thickness of the half-wavelength plate 203 is slightly shifted from a thickness required for functioning as a half-wavelength plate, the left-handed circularly polarized light 206 is converted to elliptically polarized light. The intensity of light indicated by the reference numeral 209 is decreased in accordance with the aspect ratio of the elliptically polarized light, compared to the above case. The degree of the decrease in the intensity increases as the shift of the thickness of the nematic liquid crystal layer 203 from the thickness required for functioning as a half-wavelength plate is increased. For example, when the thickness of the half-wavelength plate 203 is 0 (the half-wavelength plate 203 does not exist), the right-handed circularly polarized light 205 is transmitted through the cholesteric liquid crystal layer 202 and is absorbed by the light absorbing layer 201. Accordingly, in observation using the circularly polarizing filter 204, the reflected light from the cholesteric liquid crystal layer 202 shown in FIG. 2 is not observed (or is not easily observed), and the optical medium appears to be dark.

In direct observation without using the light polarizing filter 204, since the nematic liquid crystal layer 203 is transparent and is not easily observed, the reflected light from the nematic liquid crystal layer 202 is observed. In this case, even if the nematic liquid crystal layer 203 has a thickness distribution, the reflected light is not greatly changed, and the thickness distribution is not observed (or is not easily observed).

According to this function, by forming the thickness distribution of the nematic liquid crystal layer 203 so as to correspond to contrasting densities of an image, gradation of the reflected light is perceived by observing through the circularly polarizing filter 204. That is, in observation through the circularly polarizing filter 204, a latent image having contrasting densities is perceived. On the other hand, in observation without using the circularly polarizing filter 204, the graded image cannot be perceived (or is not easily perceived). If a circularly polarizing filter for transmitting light having a reverse circling direction is used, a condition in which the gradation of the image is reversed is observed. In this case, a latent image having contrasting densities is observed.

The half-wavelength plate is also called a half-phase difference plate and is an optical element that generates a phase difference of a half-wavelength (phase difference of $\pi(180°)$) between mutually perpendicular polarized components by birefringence effect when light passes therethrough. When circularly polarized light or elliptically polarized light is transmitted through the half-wavelength plate, the circling direction thereof is reversed.

The cholesteric liquid crystal layer is a liquid crystal layer that selectively reflects right-handed or left-handed circularly polarized light having a predetermined wavelength when natural light enters thereinto. The cholesteric liquid crystal layer has a laminated structure. In one layer, long axes of liquid crystal molecules have the same orientation and are parallel to the plane thereof in a layer. The directions of the orientation slightly differ with respect to the adjacent layer, and the layers are stacked with the orientations rotated in a three-dimensional spiral structure overall. In this structure, in a direction perpendicular to the layer, pitch P is a distance necessary for the molecular long axis to be rotated through 360° and return to the initial state, and an average refraction index of the respective layers is index n. In this case, the cholesteric liquid crystal layer selectively reflects circularly polarized light having a center wavelength $\lambda s$ satisfying the equation $\lambda s = n \times P$ and having a predetermined circling direction. That is, when white light, which has uniformly polarized components, enters into the cholesteric liquid crystal layer, right-handed or left-handed circularly polarized light having a predetermined center wavelength is selectively reflected. In this case, circularly polarized light having a circling direction opposite to that of the reflected circularly polarized light having the same wavelength of $\lambda s$, and natural light having the other wavelengths, are transmitted through the cholesteric liquid crystal layer.

The circling direction (rotating direction) of the reflected circularly polarized light is selected by setting a spiral direction of the cholesteric liquid crystal layer. That is, when the long axes are seen from the incident direction of light, by selecting either the spiral direction in which the molecular long axis of each layer orientation is clockwise or counterclockwise, the circling direction (rotating direction) of the reflected circularly polarized light is selected.

The cholesteric liquid crystal exhibits an optical characteristic called "color shifting" in which color varies with viewing angle. This is because the pitch P apparently decreases when the viewing angle increases, and the center wavelength $\lambda s$ shifts toward a shorter wavelength. For example, when a cholesteric liquid crystal is observed from a vertical direction, the reflected color thereof is red, and it is observed to shift to orange, yellow, green, and blue in turn as the viewing angle increases. It should be noted that the viewing angle is defined as the angle formed by a visual line and a vertical line against the surface of the identifying medium.

Effects of the Invention

According to the present invention, an identifying medium using a latent image with multiple tones is provided at low cost. That is, according to the present invention, a continuous-tone image functioning as a latent image is formed by the thickness distribution of the nematic liquid crystal layer, and the thickness distribution of the liquid crystal layer is easily set by a printing method, whereby a continuous-tone indication with high quality is obtained at low cost. Moreover, by using a printing method, a wide variety of products is easily manufactured in small quantities. By using a latent image, a superior identifying function is obtained. In addition, by using a latent image, a latent identifying function, which cannot be perceived by eye, is obtained, and a superior function for determining authenticity is obtained. Furthermore, by using a latent image, identification may be performed by multiple steps. A high-resolution image such as a photograph may be used for identification. Since an image indicated by continuous tones is used for identification, an identifying medium that cannot be easily counterfeited is obtained.

BRIEF DESCRIPTION OF THE DRAWINGS

FIG. 1 is a schematic drawing showing a function of the present invention.

FIG. 2 is a schematic drawing showing a function of the present invention.

EXPLANATION OF REFERENCE NUMERALS

1 denotes an identifying medium, 2 denotes an identifying medium, 11 denotes a base, 12 denotes a light-reflecting layer, 21 denotes an orientation layer, 31 denotes a nematic liquid crystal layer, 32 denotes a protective layer, 33 denotes a reflecting layer, 34 denotes a diffraction structure layer, 35 denotes a nematic liquid crystal layer, 36 denotes an adhesive layer, 37 denotes an exfoliative layer, 38 denotes a hot melting layer, 41 denotes a cholesteric liquid crystal layer, and 42 denotes a black adhesive layer.

BEST MODE FOR CARRYING OUT THE INVENTION

1. First Embodiment

Structure of Embodiment

Figure 3:
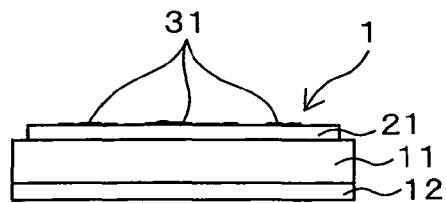
FIG. 3 is a sectional view of an embodiment.

This embodiment is an example of forming a latent image, which exhibits tones, by forming a nematic liquid crystal layer so as to have a distribution of thickness that is shifted from a thickness required for functioning as a quarter-wavelength plate. FIG. 3 is a sectional view schematically showing an identifying medium using the present invention. FIG. 3 shows an identifying medium 1 in which a light-reflecting layer 12 is provided on a back surface of a transparent base 11, and an orientation layer 21 and a nematic liquid crystal layer 31 are provided to a surface of the base 11. The nematic liquid crystal layer 31 exhibits multiple tones according to the thickness distribution and forms a predetermined image. In this case, FIG. 3 shows an example of a structure having portions at which the nematic liquid crystal layer 31 is not formed.

In this example, the base 11 is made of TAC (triacetyl cellulose). The base 11 has a light-reflecting layer 12 at the back surface thereof, through which light passes in identification, and therefore, the base 11 is desirably made of TAC which does not easily generate birefringence. The light-reflecting layer 12 is a vapor-deposited aluminum layer. The orientation layer 21 is formed by performing an orientation treatment on a polyimide resin layer. The nematic liquid crystal layer 31 is formed by a printing method and has a thickness distribution in which a deviation from a thickness required for functioning as a quarter-wavelength plate is set according to contrasting densities of the image to be indicated. Specifically, in observation through a linearly polarizing plate, a portion for black (deep) indication of the nematic liquid crystal layer 31 is formed so as to have a thickness required for functioning as a quarter-wavelength plate (or another wavelength plate close to the quarter-wavelength plate). In addition, the thickness of the nematic liquid crystal layer 31 is decreased from a thickness required for functioning as a quarter-wavelength plate, as the contrasting density is decreased. The relationship between the tone condition (gradation condition) that can be observed and the thickness of the nematic liquid crystal layer 31 is obtained from data that has been experimentally measured.

The above description is an example of n=0 under conditions in which a phase difference is generated by shifting (¼) wavelength from (n/2) wavelength, and the identifying medium may be designed based on n=1. In this case, there are two embodiments. In one of the embodiments, the thickness distribution of the nematic liquid crystal layer 31 is set so that the thickness increases from a thickness required for functioning as a quarter-wavelength plate, and the nematic liquid crystal layer 31 has a distribution of thickness required for functioning as from a quarter-wavelength plate to a half-wavelength plate. In this case, in observation through a linearly polarizing plate, a portion of the nematic liquid crystal layer 31 that functions as a quarter-wavelength plate exhibits a black indication, and a portion of the nematic liquid crystal layer 31 that functions as a half-wavelength plate exhibits a white indication. The other embodiment is an example of forming the nematic liquid crystal layer 31 so as to have a distribution of thickness required for functioning as from a half-wavelength to a three-quarter-wavelength plate. In this case, in observation through a linearly polarizing plate, a portion, in which the nematic liquid crystal layer 31 functions as a half-wavelength plate, exhibits a white indication, and a portion, in which the nematic liquid crystal layer 31 functions as a three-quarter-wavelength plate, exhibits a black indication.

When the identifying medium 1 shown in FIG. 3 is directly observed, since the nematic liquid crystal layer 31 is substantially transparent, an image formed by the thickness distribution of the nematic liquid crystal layer 31 is scarcely perceived (the image may be slightly perceived depending on the kind of nematic liquid crystal, but it is not easily and clearly perceived). When the identifying medium 1 is observed through the linearly polarizing plate (not shown in the figure), a continuous-tone image (an image having contrasting densities) formed by the thickness distribution of the nematic liquid crystal layer 31 is perceived according to the function shown in FIG. 1. That is, a latent image is observed.

Figure 4:
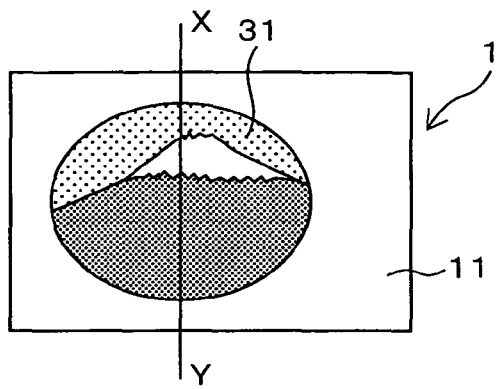
FIG. 4 is an image showing an observed condition of an embodiment.

FIG. 4 is an image showing an example of a continuous-tone image formed by the thickness distribution of the nematic liquid crystal layer 31. The cross section taken along line X-Y in FIG. 4 is shown in FIG. 3. As shown in FIG. 4, an image including fine contrasting densities such as a scenery image can be easily formed by the thickness distribution of the nematic liquid crystal layer 31.

Production Method of First Embodiment

An example of a production method for the identifying medium shown in FIG. 1 is described hereinafter. First, a base 11 made of TAC film is prepared. A vapor-deposited aluminum layer is formed on a back surface of the base 11 as a light-reflecting layer 12 by a vapor-deposition method. Then, a polyimide resin film is formed on the surface of the base 11 by a spin-coating method and is subjected to a light orientation treatment, whereby an orientation layer 21 is formed. The orientation treatment may be performed by a rubbing method. After the orientation layer 21 is formed, a nematic liquid crystal layer 31 is formed on the orientation layer 21 by ink jet printing using an ink including nematic liquid crystals (liquid crystal ink). In this case, the thickness distribution of the nematic liquid crystal layer to be printed is adjusted so as to correspond to contrasting densities of an image. This thickness distribution is set within a range in which the nematic liquid crystal layer functions as from a zero-wavelength plate to a quarter-wavelength plate, according to the contrasting densities to be indicated. The thickness distribution is adjusted by controlling the amount of the liquid crystal ink to be deposited. Thus, an identifying medium 1 having a cross sectional structure shown in FIG. 3 is obtained. According to the production method, the thickness distribution of the nematic liquid crystal layer 31 is formed by an existing printing technique, whereby a continuous-tone indication may be freely obtained at low cost. As the liquid crystal ink, a liquid crystal material (trade name: PALIOCOLOR) produced by BASF may be dissolved in a solution and be used.

Modification of First Embodiment

Figure 5:
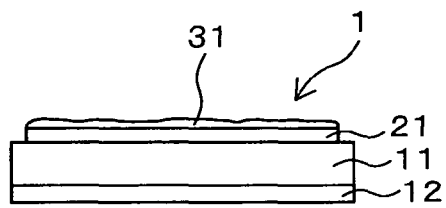
FIG. 5 is a sectional view of an embodiment.

FIG. 5 is a sectional view showing another example of an identifying medium using the present invention. FIG. 5 shows an identifying medium 1 in which the thickness of a nematic liquid crystal layer 31 is greater compared to that in the structure shown in FIG. 3, and the nematic liquid crystal layer 31 is formed on the entire surface of the area to be used for identification. In this case, the circumference of the edge portion of the nematic liquid crystal layer 31 does not exist on the surface of the area to be used for identification, whereby the nematic liquid crystal layer 31 is not easily perceived when the identifying medium is directly viewed. Therefore, the function of the nematic liquid crystal layer 31 as a latent image of a continuous-tone image shown in FIG. 4 is more improved.

Figure 6:
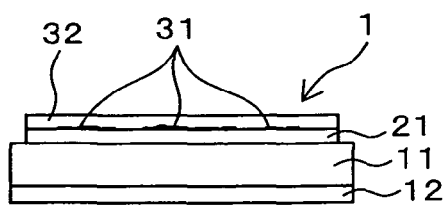
FIG. 6 is a sectional view of an embodiment.

FIG. 6 is a sectional view showing another example. In the example shown in FIG. 6, a protective layer 32 is provided on a nematic liquid crystal layer 31, thereby improving the durability of an identifying medium 1. The protective layer 32 is made of a resin material (for example, an acrylic resin) which is transparent and has approximately the same refractive index as that of the nematic liquid crystal layer 31, and which does not affect polarization conditions of light transmitted therethrough as much as possible.

Figure 7:
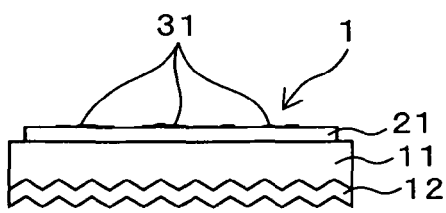
FIG. 7 is a sectional view of an embodiment.

FIG. 7 is a sectional view showing another example. In the example shown in FIG. 7, a light-reflecting layer 12 is embossed by press embossing so as to have a diffraction grating structure, thereby forming a hologram indication. According to this structure, only the hologram is observed, and a latent image is not observed (or is not easily observed) in direct viewing, whereas the hologram image and the latent image of the nematic liquid crystal layer 31 are observed in observation through a linearly polarizing plate.

Figure 8:
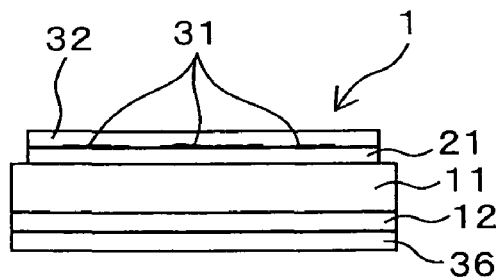
FIG. 8 is a sectional view of an embodiment.

FIG. 8 is a sectional view showing another example. In the example shown in FIG. 8, an adhesive layer 36 is provided to the back surface of the structure exemplified in FIG. 6. By providing the adhesive layer 36, the identifying medium 1 may be affixed as a sticker (a seal) to an article to be identified. The adhesive layer 36 may be made of a publicly known adhesive material. In order to prevent inappropriate reuse, the adhesive layer 36 is desirably made of a material having an adhesive strength of a degree so that the identifying medium is not easily peeled off and having a delamination fracture characteristic so that the seal or the adhesive layer 36 breaks while being peeled off even if the identifying medium is peeled off.

Figure 9:
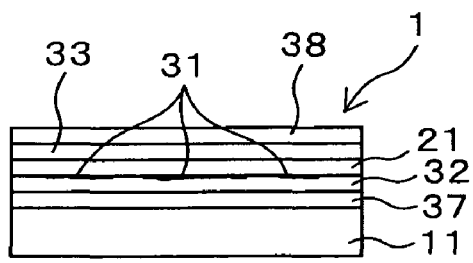
FIG. 9 is a sectional view of an embodiment.

FIG. 9 is a sectional view showing another example. FIG. 9 shows an example of an identifying medium that is affixable by a thermal transfer method. In this case, the identifying medium 1 is formed by laminating an exfoliative layer 37, a protective layer 32, a nematic liquid crystal layer 31, an orientation layer 21, a reflecting layer 33, and a hot melting layer 38 on a base 11. This identifying medium 1 is used by observing from the protective layer 32.

An example of a production method for the identifying medium 1 shown in FIG. 9 is described hereinafter. First, a hot melting layer 38 is formed on an appropriate base (not shown in the figure). A reflecting layer 33 and an orientation layer 21 are formed on the hot melting layer 38, and the orientation layer 21 is subjected to an orientation treatment. Then, a nematic liquid crystal layer 31 is formed on the orientation layer 21, and a protective layer 32 and an exfoliative layer 37 are formed on the nematic liquid crystal layer 31. The hot melting layer 38 is made of a material which exhibits adhesive strength by heating. The exfoliative layer 37 has a small adhesive strength with respect to the protective layer 32. The protective layer 32 is made of a transparent resin of a material that does not affect the polarization condition of light transmitted therethrough as much as possible. In this condition, the appropriate base (not shown in the figure) is peeled off, whereby the structure shown in FIG. 9 is obtained.

The identifying medium 1 shown in FIG. 9 is placed on an article so that the hot melting layer 38 faces the article, and hot stamping is performed thereto from the base 11. In this case, the hot melting layer 38 is melted (or softened) and adheres to the article. Simultaneously, the exfoliative layer 37 and the protective layer 32 are separated from each other, and the upper portion from the protective layer 32 is adhered to the article as an identifying medium.

Figure 10:
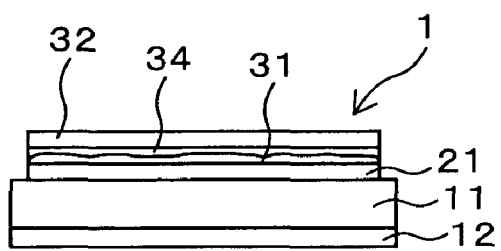
FIG. 10 is a sectional view of an embodiment.

FIG. 10 is a sectional view showing another example. FIG. 10 shows an example including a structure formed by laminating a light-reflecting layer 12, a base 11, an orientation layer 21, a nematic liquid crystal layer 31, a diffraction structure layer 34, and a protective layer 32. The diffraction structure layer 34 has a diffraction granting structure formed by embossing a transparent resin layer of polyester, and the diffraction structure layer 34 forms a hologram. According to this structure, only the hologram is observed in direct viewing, and the hologram and a latent image formed by the nematic liquid crystal layer 31 are observed in observation through a linearly polarizing plate. When the diffraction structure layer is arranged under the orientation layer 21, the same effect as the above effect is obtained.

For example, in the structure shown in FIG. 6, when the surface of an article, to which the identifying medium 1 is affixed, has a metallic luster, a transparent adhesive layer may be provided instead of the light-reflecting layer 12, whereby the surface of the article may be used as a light-reflecting layer. In the structures shown in FIGS. 3, 5, 6, 7, and 10, an adhesive layer may be provided to the under surface of the light-reflecting layer 12 so that the identifying medium 1 may be used by affixing as a seal.

2. Second Embodiment

Figure 11:
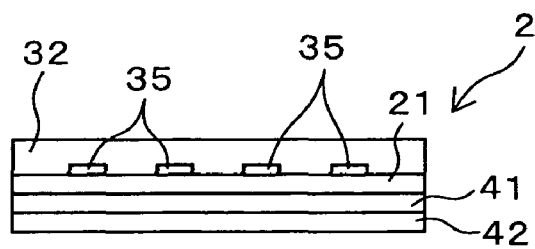
FIG. 11 is a sectional view of a basic structure of an embodiment.

This embodiment is an example of an identifying medium using a nematic liquid crystal layer and a cholesteric liquid crystal layer. First, a basic structure will be described. FIG. 11 is a sectional view of a basic structure. FIG. 11 shows an identifying medium 2 formed by laminating a black adhesive layer 42 that functions as a light absorbing layer, a cholesteric liquid crystal layer 41, an orientation layer 21, a nematic liquid crystal layer 35, and a protective layer 32.

The black adhesive layer 42 also functions as an adhesive layer for affixing the identifying medium 2 to an article to be identified. The black adhesive layer 42 is made of an adhesive material including black pigments. The cholesteric liquid crystal layer 41 is formed so as to selectively reflect left-handed circularly polarized light having a predetermined color (for example, gold). The nematic liquid crystal layer 35 is formed by printing and has a thickness required for functioning as a half-wavelength plate.

Figure 12:
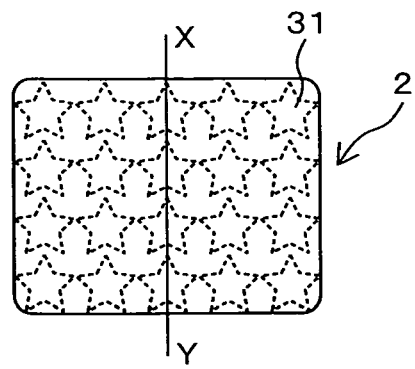
FIG. 12 is an image showing an observed condition of an embodiment.

FIG. 12 shows an example of an image observed when the identifying medium 2 shown in FIG. 11 is directly viewed. FIG. 12 shows an example of the nematic liquid crystal layer 35 formed into a pattern of stars. The cross section taken along line X-Y in FIG. 12 is shown in FIG. 11. In this case, since the nematic liquid crystal layer 35 is transparent and is not easily perceived, the pattern of the stars cannot be perceived (or is not easily perceived), and reflected light in gold from the entire surface of the cholesteric liquid crystal layer 41 is perceived.

Figure 13:
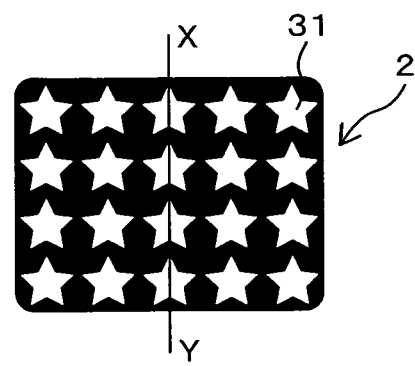
FIG. 13 is an image showing an observed condition of an embodiment.

FIG. 13 shows an example of an image observed when the identifying medium 2 shown in FIG. 11 is observed through a right-handed circularly polarizing filter that selectively transmits right-handed circularly polarized light. When the identifying medium 2 shown in FIG. 11 is observed through the right-handed circularly polarizing filter, in an area in which the star-shaped nematic liquid crystal layer 35 is not formed, incident light of right-handed circularly polarized light is transmitted through the cholesteric liquid crystal layer 41, and the incident light is absorbed by the black absorbing layer 42. On the other hand, in an area in which the star-shaped nematic liquid crystal layer 35 is formed, the incident light of the right-handed circularly polarized light is converted to left-handed circularly polarized light by passing through the nematic liquid crystal layer 35, and a gold spectrum component thereof is selectively reflected at the cholesteric liquid crystal layer 41. The left-handed circularly polarized light in gold reflected at the cholesteric liquid crystal layer 41 is converted to right-handed circularly polarized light at the nematic liquid crystal layer 35 and is transmitted through the right-handed circularly polarizing filter (not shown in the figure), thereby being perceived by an observer. That is, a gold star-shaped pattern is perceived in a black background (FIG. 13).

Figure 14:
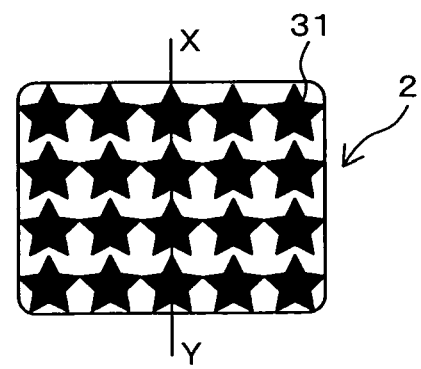
FIG. 14 is an image showing an observed condition of an embodiment.

FIG. 14 shows an example of an image observed when the identifying medium 2 shown in FIG. 11 is observed through a left-handed circularly polarizing filter that selectively transmits left-handed circularly polarized light. In this case, in an area in which the star-shaped nematic liquid crystal layer 35 is not formed, a gold component of the left-handed circularly polarized light is reflected at the cholesteric liquid crystal layer 41. On the other hand, in an area in which the star-shaped nematic liquid crystal layer 35 is formed, incident light of the left-handed circularly polarized light is converted to right-handed circularly polarized light by passing through the nematic liquid crystal layer 35. Then, the right-handed circularly polarized light is transmitted through the cholesteric liquid crystal layer 41 and is absorbed by the black adhesive layer 42. As a result, a black star-shaped pattern is perceived in a gold background (FIG. 14).

As described above, a star-shaped latent image cannot be perceived when the identifying medium 2 shown in FIG. 11 is viewed directly, whereas the latent image is observed and is also observed as a reverse image by using either the right-handed circularly polarizing filter or the left-handed circularly polarizing filter. By using these optical characteristics, superior identifying function is obtained.

Figure 15:
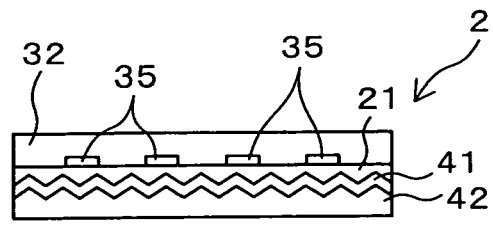
FIG. 15 is a sectional view of an embodiment.

In the structure shown in FIG. 11, the cholesteric liquid crystal layer 41 may be subjected to a hologram processing by embossing, whereby a hologram image may be formed. FIG. 15 is a sectional view of an example of a cholesteric liquid crystal layer 41 subjected to a hologram processing. In this case, only a design of a gold hologram is observed by direct viewing, whereas a gold latent image with the hologram emerges in a dark background by viewing through a circularly polarizing filter. When the viewing angle is changed, the entire surface of the identifying medium exhibits color shifting, and the tones of the appearance thereof are varied.

Figure 16:
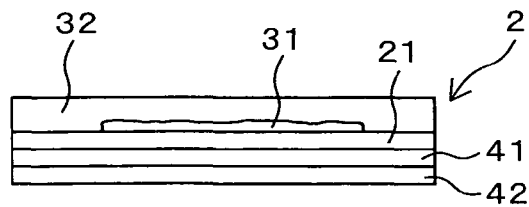
FIG. 16 is a sectional view of an embodiment.

In the structure shown in FIG. 11, by forming the nematic liquid crystal layer so as to have a distribution of thickness that is shifted from a thickness required for functioning as a half-wavelength plate, an image to be used for identifying is indicated by continuous tones. FIG. 16 is a sectional view showing an example of an identifying medium in which a latent image indicated by continuous tones is observed, and the latent image is indicated by using a cholesteric liquid crystal layer and a nematic liquid crystal layer having a thickness distribution.

FIG. 16 shows an identifying medium 2 formed by laminating a black adhesive layer 42, a cholesteric liquid crystal layer 41, an orientation layer 21, a nematic liquid crystal layer 31, and a protective layer 32. In this case, the cholesteric liquid crystal layer 41 is the same material as that shown in FIG. 11.

The nematic liquid crystal layer 31 is formed so as to have a thickness required for functioning as a half-wavelength plate at black indication portions. The nematic liquid crystal layer 31 is also formed so as to have a distribution of thickness that is decreased from the thickness required for functioning as the half-wavelength plate as color fades, in order to show a mountain scenery image by the thickness distribution. Specifically, in portions to be used for indicating black (deep) color in observation through a left-handed circularly polarizing filter, the nematic liquid crystal layer 31 is set to have a thickness required for functioning as a half-wavelength plate. In addition, the thickness of the nematic liquid crystal layer 31 is decreased from the thickness required for functioning as the half-wavelength plate as contrasting densities are decreased. The relationship between the tone condition (gradation condition) that can be observed and the thickness of the nematic liquid crystal layer 31 is obtained from data that has been experimentally measured. The thickness distribution of the nematic liquid crystal layer 31 may be increased from the thickness required for functioning as the half-wavelength plate. In this case, the upper limit of the thickness of the nematic liquid crystal layer is defined by a thickness required for functioning as a one-wavelength plate.

Figure 17:
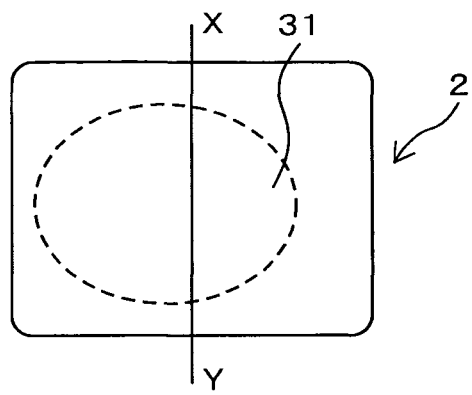
FIG. 17 is an image showing an observed condition of an embodiment.

FIG. 17 shows an example of an image that is observed when the identifying medium 2 shown in FIG. 16 is directly observed. When the identifying medium 2 shown in FIG. 16 is directly observed, the nematic liquid crystal layer 31 cannot be observed (or is not easily observed), and the mountain scenery image cannot be observed (or is not easily observed). In this case, the entire surface of the identifying medium 2 appears to be gold.

Figure 18:
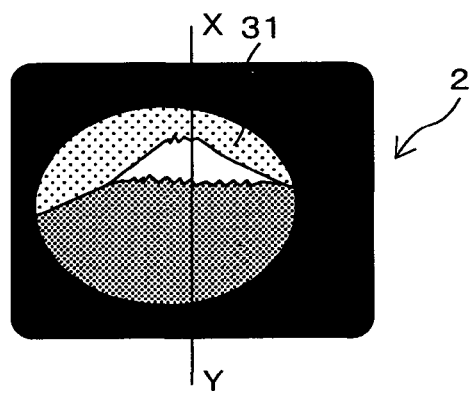
FIG. 18 is an image showing an observed condition of an embodiment.

FIG. 18 shows an example of an image that is observed when the identifying medium 2 shown in FIG. 16 is observed through a right-handed circularly polarizing filter. In this case, in an area which does not have the nematic liquid crystal layer 31, right-handed circularly polarized light transmitted through the right-handed circularly polarizing filter (not shown in the figure) is transmitted through the cholesteric liquid crystal layer 41 and is absorbed by the black adhesive layer 42. On the other hand, in an area having the nematic liquid crystal layer 31, right-handed circularly polarized light transmitted through the right-handed circularly polarizing filter (not shown in the figure) is converted to left-handed circularly polarized light and left-handed elliptically polarized light by the nematic liquid crystal layer 31 according to the thickness distribution. The left-handed circularly polarized light and the left-handed elliptically polarized light are reflected at the cholesteric liquid crystal layer 41 and are reversed by the nematic liquid crystal layer 31, and then they are transmitted through the right-handed circularly polarizing filter (not shown in the figure) while having intensities corresponding to the aspect ratio. Therefore, in the portion having the nematic liquid crystal layer 31, gradation is observed in accordance with the thickness distribution of the nematic liquid crystal layer 31. Thus, the mountain scenery image (latent image) indicated by continuous tones as shown in FIG. 18 is observed.

Figure 19:
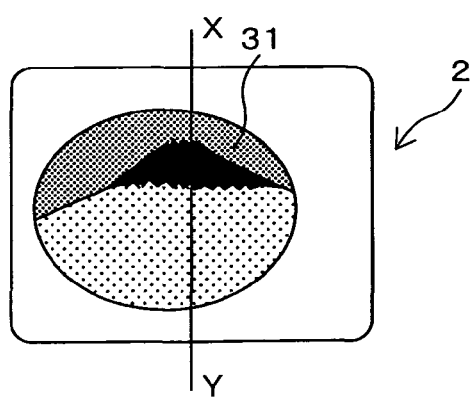
FIG. 19 is an image showing an observed condition of an embodiment.

FIG. 19 shows an example of an image that is observed when the identifying medium 2 shown in FIG. 16 is viewed through a left-handed circularly polarizing filter. In this case, an image with reverse gradation of the image in FIG. 18 is observed, and a latent image, which cannot be observed (or is not easily observed) by direct viewing (in the case of FIG. 17), is observed.

3. Third Embodiment

Identification as described in the first and the second embodiments may be performed by a mechanical (or electrical) method, instead of observation using the eyes. In this case, the following structure is used. An identifying medium is photographed by camera through a linearly polarizing plate (a case described in the first embodiment) or a circularly polarizing plate (a case described in the second embodiment), and the image data is compared to a standard image data. Then, when the image data appears to correspond to the standard image data, the identifying medium is determined to be authentic, whereas when the image data does not appear to correspond to the standard image data, the identifying medium is determined to be counterfeit.

4. Fourth Embodiment

Examples of articles to which the identifying medium of the first embodiment or the second embodiment is affixed are described. As such articles, credit cards, passports, license cards, and the like may be mentioned. Since whether it is counterfeited or not is very important for such articles, an identifying medium of the present invention, which has superior identifying characteristic and is not easily counterfeited, is effectively used for the articles.

The embodiments using the present invention are described above as examples, and the present invention is not limited to the laminated structures shown in the figures. The present invention may be used with various modifications within the range of the descriptions in the claims.

INDUSTRIAL APPLICABILITY

The present invention may be used for identifying mediums in which authenticity is determined by direct viewing or by image processing.

The invention claimed is:

1. An identifying medium comprising a nematic liquid crystal layer for forming a latent image with gradation, wherein
the nematic liquid crystal layer has a thickness distribution corresponding to the gradation,
the latent image is a graded image obtained by partially changing the thickness of the nematic liquid crystal layer so that intensity of light reflected at the nematic liquid crystal layer is changed, and
the graded image is not perceived by direct observation without using a polarizing plate and is perceived by observing through the polarizing plate.

2. An identifying medium comprising a nematic liquid crystal layer for forming a latent image, wherein
the nematic liquid crystal layer has a thickness that is partially changed within a range in which a phase is shifted from (n/2) wavelength (n is a natural number including 0) by ±(¼) wavelength with respect to a wavelength used in identification,
the latent image is a graded image obtained by the partial change of the thickness of the nematic liquid crystal layer, and
the graded image is not perceived by direct observation without using a linearly polarizing plate and is perceived by observing through the linearly polarizing plate.

3. An identifying medium comprising:
a cholesteric liquid crystal layer; and
a nematic liquid crystal layer for forming a latent image, which is formed over the cholesteric liquid crystal layer, wherein
the nematic liquid crystal layer has a thickness that is partially changed within a range in which a phase is shifted from n+(½) wavelength (n is a natural number including 0) by ±(½) wavelength with respect to a wavelength used in identification, the latent image is a graded image obtained by the partial change of the thickness of the nematic liquid crystal layer and the graded image is not perceived by direct observation without using a circularly polarizing plate and is perceived by observing through the circularly polarizing plate.

4. The identifying medium according to claim 2, wherein the distribution of the phase difference is formed by setting the thickness of the nematic liquid crystal layer.

5. The identifying medium according to claim 2, wherein the nematic liquid crystal layer has a thickness distribution in accordance with the tones of the latent image.

6. The identifying medium according to claim 1, wherein the identifying medium comprises a diffraction grating structure over or under the nematic liquid crystal layer.

7. An article having the identifying medium recited in claim 1.

8. A production method for the identifying medium recited in claim 1, the method comprising printing the nematic liquid crystal layer by ink jet printing using a liquid crystal ink.

9. An identifying method for the identifying medium recited in claim 2, the method comprising:

photographing the identifying medium through a linearly polarizing plate; and identifying the identifying medium by using the latent image.

10. An identifying method for the identifying medium recited in claim 3, the method comprising:

photographing the identifying medium through a circularly polarizing plate; and identifying the identifying medium by using the latent image.

11. The identifying medium according to claim 3, wherein the distribution of the phase difference is formed by setting the thickness of the nematic liquid crystal layer.

12. The identifying medium according to claim 3, wherein the nematic liquid crystal layer has a thickness distribution in accordance with the tones of the latent image.

13. The identifying medium according to claim 2, wherein the identifying medium comprises a diffraction grating structure over or under the nematic liquid crystal layer.

14. The identifying medium according to claim 3, wherein the identifying medium comprises a diffraction grating structure over or under the nematic liquid crystal layer.

15. An article having the identifying medium recited in claim 2.

16. An article having the identifying medium recited in claim 3.

17. A production method for the identifying medium recited in claim 2, the method comprising printing the nematic liquid crystal layer by ink jet printing using a liquid crystal ink.

18. A production method for the identifying medium recited in claim 3, the method comprising printing the nematic liquid crystal layer by ink jet printing using a liquid crystal ink.

* * * * *